March 11, 1969
R. W. WARREN
3,432,144
PRIME MOVER LIMIT CONTROL
Filed March 2, 1967
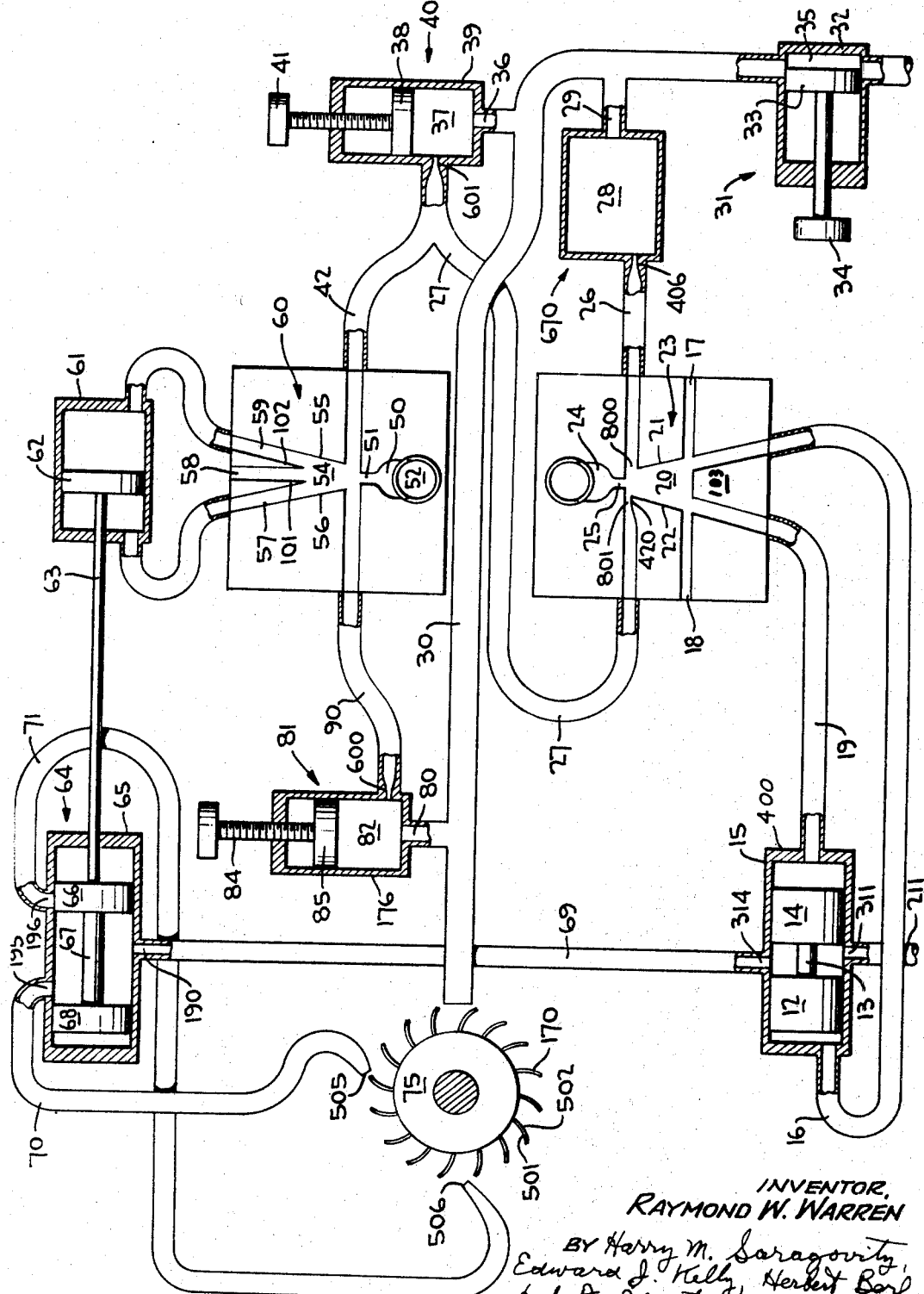
INVENTOR.
RAYMOND W. WARREN
BY Harry M. Saragovitz,
Edward J. Kelly, Herbert Berl
& J. D. Edgerton
ATTORNEYS United States Patent Office 3,432,144
Patented Mar. 11, 1969

3,432,144
PRIME MOVER LIMIT CONTROL
Raymond W. Warren, McLean, Va., assignor to the United States of America as represented by the Secretary of the Army
Filed Mar. 2, 1967, Ser. No. 629,849
U.S. Cl. 253—1
Int. Cl. F01d 17/06, 17/20, 21/02
14 Claims

ABSTRACT OF THE DISCLOSURE

Two fluid resonators detect an overspeed and underspeed condition of a rotating prime mover. Control means are associated with said resonators to continuously control the speed of the rotating prime mover.

---

This invention relates to the prime mover control art and in particular to a control system capable of regulating the angular speed of a rotary prime mover, such as a turbine, between a preselected upper limit and a preselected lower limit.

The importance of velocity regulation for prime movers, such as fluid driven turbines, has long been recognized. Present day prime mover control systems have moving parts, such as flyweights, springs and valves, and precise prime mover angular velocity control has been encumbered by the friction, thermal expansion, wear and tear which are inherent in the aforesaid mechanical control apparatus. Prior art devices, such as I have described, have long response times because of the abundance of mechanical parts and are extremely costly because of the great amounts of precisely machined equipment the control system requires.

It is therefore an object of the present invention to provide a prime mover control system that has a rapid response time to speeds outside the selected range of a prime mover.

It is a further object of the present invention to provide a prime mover control system that has a rapid response time to speeds outside the selected range of a prime mover and is flexible enough to simply vary the selected speed range of the prime mover.

It is a further object of the present invention to provide a prime mover control system that utilizes a minimum of moving parts.

Still a further object of the present invention is to provide a prime mover control system that is easy to make, requires a minimum of maintenance and will have a long operating life.

Briefly, in accordance with the present invention a first Helmholtz fluid resonator senses an overspeed condition of the prime mover while a second Helmholtz fluid resonator senses an underspeed condition of the prime mover. Power supply means are associated with the first Helmholtz fluid resonator to decrease the power supplied to the prime mover in response to a sensed overspeed condition while the second Helmholtz resonator will increase the power supplied to the prime mover in response to a sensed underspeed condition.

Other objects and aspects of the present invention will clearly appear from the following description and from the accompanying drawing in which:

The figure is a schematic representation of an embodiment of the present invention.

In the figure, a rotary prime mover 75, such as a turbine, is shown having a series of curved blades 170, each blade having a power arcuate surface 501 and a rear surface 502. A source of pressure fluid, not shown, is connected to an inlet conduit 211 of a speed limit cut-off valve 15. Speed limit cut-off valve 15 includes a cylinder having an inlet port 311, in communication with inlet conduit 211, and a discharge port 314. A spool valve is inside housing 400 and has lands 12 and 14 separated by a rod 13. A conduit 19 communicates with the right end of housing 400 and a conduit 16 communicates with the left end of cylinder 400. If conduit 19 is pressurized the valve spool in housing 400 will move to the left of housing 400 allowing inlet port 311 to communicate with discharge port 314 while if conduit 16 is pressurized the valve spool in housing 400 will move to the right and land 12 will block communication between inlet port 311 and discharge port 314. Discharge port 314 communicates with a conduit 69 which communicates with an inlet port 190 of a three-way control valve 64. Three-way control valve 64 has a housing 65 which defines a left discharge port 195 and a right discharge port 196. Inside housing 65 is a valve spool having a left land 68 and a right land 66 separated from each other by a rod 67. Left discharge port 195 communicates with a power conduit 70, the end 505 of which is positioned to direct fluid against power surfaces 501 of blades 170 to impart rotational energy to prime mover 75. Right discharge port 196 leads to a retarding conduit 71 which, at end 506, is positioned to direct fluid against the rear 501 of blades 170, tending to slow the rotation of prime mover 75 from its counterclockwise rotation. While I have shown retarding conduit 71 leading to the rear of blades 170 to slow the rotation of prime mover 75 it is obvious that conduit 71 could be connected to any of the well known speed retarding means that could be used with a rotating prime mover. One example might be a pressure activated brake shoe connected to the power shaft of the rotary prime mover. Rod 67 is of such a length that when land 68 is to the left of left discharge port 195, allowing communication between inlet port 190 and left discharge port 195, land 66 is blocking communication between inlet port 190 and right discharge port 196, while when land 66 is to the right of right discharge port 196 allowing communication between inlet port 190 and right discharge port 196, land 68 will block communication between inlet port 190 and left discharge port 195.

A main tube 30 is position adjacent prime mover 75, and in particular blades 170 thereon, so that each time a blade 170 passes the opening of main tube 30 a pulse of fluid will be directed into the main tube. A first branch conduit 80 is in parallel with main tube 30 and leads to a Helmholtz fluid resonator 81. Helmholtz resonator 81 includes a cylinder 176 housing a piston 85, the latter being movable in cylinder 176, to vary volume 82 therein by screw mechanism 84. Branch conduit 80 is of a larger cross-sectional area than discharge port 600 which leads to a conduit 90 which serves as the left control of a tristable amplifier or flip-flop 60. Tristable flip-flop 60 has a source of pressure fluid (not shown) connected to an inlet conduit 50, which by a power nozzle 51, is directed into an interaction chamber 54. Interaction chamber 54 has a straight left sidewall 56 and a straight right sidewall 55. A left splitter 101 with left sidewall 56 serves to define a left output conduit 57 while a right splitter 102 along with right sidewall 55 serves to define a right output conduit 59. Formed between splitters 101 and 102 is a center vent 58 which is in alignment with power jet 51. A conduit 42 serves as the right control for tristable flip-flop 60. Left output passage 57 communicates with the left side of cylinder 61, while right output passage 59 communicates with the right side of cylinder 61. Housed in cylinder 61 is a piston 62 which has a rod 63 attached thereto and extending from the left side of cylinder 61 through the right side of 65 to land 66 to which it is joined. A second branch conduit 36 communicates main tube 30 with a second Helmholtz fluid resonator 40, the latter including a cylinder 39 housing a piston 38 therein and an adjustable screw mechanism 41 for moving piston 38 in cylinder 39 to vary the volume of chamber 37. A discharge port 601, of smaller cross-sectional area than constant cross-sectional area branch conduit 36, communicates chamber 37 with conduit 42. A conduit 27 is in parallel with conduit 42 and by a restriction 420 acts as the left control of a conventional bistable amplifier 23. Bistable amplifier 23 has a source of power fluid, not shown, which by a conduit 24, and a power nozzle 25, is directed into an interaction chamber 20. A straight left sidewall 22 and a straight right sidewall 21 serve to define interaction chamber 20. A pair of bleeds 18 and 17 communicate with interaction chamber 20 while splitter 103 serves to define left output passage 19 and right output passage 16. A conduit 26 serves as the right control of bistable amplifier 23. A third branch conduit 29 communicates main tube 30 with chamber 28 of Helmholtz fluid resonator 670. Branch conduit 29 is of constant cross-sectional area and of larger cross-sectional area than discharge port 406, the latter leading to right control conduit 26 of bistable amplifier 23. Main tube 30 leads to an adjustable bleed mechanism 31 which serves to control the pressure in main tube 30. Adjustable bleed mechanism 30 includes a fixed member 32 and a moveable member 33, the latter's proximity to fixed member 32 controlled by a mechanism 34. Passage 35, is determined by fixed member 32 and moveable member 33 and communicates main tube 30 with atmosphere.

In order to better understand my invention a brief description of a Helmholtz resonator is appropriate. A Helmholtz resonator will act as a band pass filter if located on a side branch from a tube. The resonator has a particular resonant frequency which can be preselected by selecting the volume of the resonator chamber. If the main tube is subjected to a series of fluid pulses either above or below the resonant frequency of the Helmholtz resonator, the latter will act as a fluid capacitor and allow fluid to flow therethrough. If the frequency of fluid pulses in the main tube matches the resonant frequency of the Helmholtz resonator, the latter will stop fluid from flowing therethrough. A further and more theoretical discussion of this phenomena can be found in "Fundamentals of Acoustics" (second edition) by Kensler and Frey (published by John Wiley and Sons, 1962).

Tristable flip-flop 60, in the absence of a signal to either of controls 90 or 42, will direct pressure fluid to center vent 58 while if a signal is applied to either of the control conduits the entire output from power nozzle 51 will be directed to the output conduit opposite the control conduit receiving the fluid signal. If fluid signals are simultaneously received by control conduits 90 and 42 there will be no pressure differential applied across fluid issuing from nozzle 51 and the fluid will be directed to center vent 58.

The frequency of pulses in main tube 30 is an indication of rotational speed of prime mover 75 since a fluid pulse will be produced in main tube 30 each time a blade 170 passes the end of main tube 30 adjacent prime mover 75. Helmholtz resonator 81 is set to resonate at a frequency of pulses in main tube 30 corresponding to the desired upper limit of rotational speed for prime mover 75 while Helmholtz resonator 40 is set to resonate at a frequency of pulses in main tube 30 corresponding to the desired lower limit of rotational speed for prime mover 75. The frequency of each of preceding two Helmholtz resonators can be adjusted by varying the volume of the resonator chamber by the appropriate adjustable screw mechanism. Resonator 670 is picked to resonate at a higher frequency than resonator 81 for a reason soon to become apparent.

When it is desired to render the system operative pressure is supplied to tristable flip-flop 60 and bistable amplifier 23 and to valve 15. The fluid in tristable flip-flop 60 will be directed to center vent 58 as there will be no fluid pressure from pulses created by blades 170 since prime mover 75 will not as yet be rotating. Power fluid from power nozzle 25 will be directed to left output conduit 19 moving speed limit cut-off valve 15 to the left communicating inlet port 311 and the power fluid therefrom to discharge port 314. As the fluid from power nozzle 25 is directed into interaction chamber 20 it will tend to entrain fluid from regions 800, 801 of the control conduits leading into interaction chamber 20. The entrainment from these regions will tend to lower the pressure in these respective areas. Right control conduit 26 will not be at a low pressure and will be able to replace the fluid at region 800 which has been entrained by the power fluid from power jet 25. The fluid entrained in region 801 by the power fluid from nozzle 25 cannot be readily replaced by the static air in conduit 27 because of restriction 420 and a low pressure region will be created in region 801, directing power fluid from power nozzle 25 to attach to left sidewall 22 from where it will be directed to left output conduit 19.

When the prime mover, prior to start up, was shut down during a previous period of running by cutting off power to valve 15, resonator 40 will have been in a resonant condition as the speed of prime mover 75 will have slowed down so the frequency of pulses in main tube 30 will have decreased to a value matching that of resonator 40. This will stop the flow of fluid to conduit 42 allowing fluid in line 90, as resonator 81 is not at a resonant condition, to direct the power jet from tristable flip-flop to line 59 shifting piston 62 and valve 64 to the left. Valve 64 will be in a position for start up. Only in extraordinary situations will valve 64 have to be manually shifted to the left. Adjustable bleed 31 will be set to insure a proper back pressure in main tube 30. With conduit 19 being pressurized speed limit cut off valve 15 will be in a leftward condition communicating pressure fluid from conduit 211, by inlet port 311, discharge port 314 and conduit 69 to control valve 64. With control valve 64 set, as previously described, inlet port 190 will communicate the pressure fluid to left discharge port 195 and to power conduit 70, the latter directing power fluid against blades 170 of prime mover 75 rotating said prime mover in a counter clockwise direction. As the blades 170 pass the end of main tube 30 adjacent prime mover 75 a series of fluid pulses will be produced in main tube 30. During start up conditions the pulses in main tube 30 will not have a high enough frequency to cause resonance in any of the resonators. Each resonator will therefore act as a fluid capacitor with resonator 81 directing fluid to conduit 90 and resonator 40 directing fluid to conduits 42 and 27. Tristable flip-flop 60 will continue to direct fluid from power nozzle 51 to center vent 58 as there will be a pressure signal simultaneously applied to left control 90 and right control 42. Piston 62 will not be moved and control valve 64 will remain as shown in the figure allowing pressure fluid from conduit 69 to be directed to power conduit 70 thus tending to increase the speed of rotational prime mover 75. Fluid pulses will pass through conduit 29 and resonator 670, and since the latter is not at a resonant condition, to right control conduit 26 maintaining the power fluid from bistable amplifier 23 to left output conduit 19. The pressure in conduit 27 will not be able to switch the power fluid issuing from nozzle 25 from output conduit 19 to output conduit 16 since conduit 27 communicates with the power fluid issuing from nozzle 25 via restriction 420 while conduit 26 has unrestricted communication with the power fluid from power nozzle 25. Power fluid in conduit 19 will maintain speed limit cut off valve 15 in a leftward position allowing pressure fluid to be communicated to control valve 64 and to power conduit 70. As the speed of prime mover 75 increases the frequency of pulses in main tube 30 will match the resonant frequency of Helmholtz resonator 40 causing the latter to stop communication of flow from branch conduit 36 to conduit 42. Since Helmholtz resonator 81 is set to resonate at a higher frequency than Helmholtz resonator 40, the former will not be at resonance and will allow fluid to be communicated from branch tube 80 to left control conduit 90 from where it will direct power fluid from nozzle 51 to right output passage 59. Fluid in conduit 59 will tend to move piston 62 to the left of cylinder 61 and, by rod 63, move control valve 64 to the left maintaining the communication of power fluid from inlet port 190 to left discharge port 195 and to power conduit 70 from where the fluid will go to help maintain and increase the speed of prime mover 75. Resonator 40 will be at resonance and there will be no fluid in conduit 27. Resonator 670, which has a high resonant frequency, will not be at resonance and will allow fluid to be communicated from branch conduit 29 to control conduit 26 maintaining the discharge of power fluid from nozzle 25 to left output conduit 19 maintaining speed limit cut off 15 in a leftward position allowing power fluid from inlet conduit 11 to be communicated to conduit 69, to power conduit 70 to prime mover 75. The continuous supply of power fluid to prime mover 75 should increase the rotational speed above the minimum desired speed as determined by resonator 40 and below the maximum desired speed as determined by resonator 81. With the speed of prime mover 75 above the minimum desired speed resonator 40 will no longer be at resonance again acting as a fluid capacitor allowing communication between branch tube 36 and conduits 42 and 27. Since resonator 81 is not at resonance fluid will be supplied to conduit 90 from branch conduit 80. With fluid in both control conduits 90 and 42 the pressure fluid from power nozzle 51 will be directed to center vent 58, allowing piston 62 to be maintained in a leftward position by lack of pressure fluid being applied to either side thereof to maintain control valve 64 in a leftward position. This will keep power fluid from inlet port 190 in communication with left discharge port 195 and power conduit 70 to direct power fluid against power surface 501 of blades 170 to increase the speed of prime mover 75. If the speed of rotary prime mover 75 should go above the desired higher limit as determined by resonator 81, the latter will be at a resonant condition since the ressonant frequency of the resonator will match the frequency of pulses in main tube 30. A resonant condition of resonator 81 will block flow from branch tube 80 to left control conduit 90. Since resonator 40 is not at resonance fluid from conduit 40 it will be directed to conduits 27 and 42. The fluid in conduit 42 will switch the power fluid in tristable flip flop to left output conduit 57 which will move piston 62 to the right along with control valve 64. When control valve 64 is moved to the right left discharge port 195 will not communicate with inlet port 190 while right discharge port 196 will communicate with inlet port 190 allowing power fluid to be supplied to retarding conduit 71 slowing the speed of prime mover 75. The fluid in conduit 27 will not be effective to switch the power fluid in bistable amplifier to output conduit 16 since resonator 28 will not be at resonance having a higher resonant frequency than resonator 81, and will allow fluid to communicate to conduit 26 and to direct power fluid from nozzle 25 to output conduit 19 with the previously described results. If the speed of prime mover 75 should drop because of the effect of flow in retarding conduit 71 resonator 81 will no longer be at resonance and will allow fluid to be communicated to left control conduit 90 from branch tube 80. Since resonator 40 will not be at resonance fluid will be present in conduit 42 combining with the fluid in conduit 90 to direct the pressure fluid from nozzle 51 to center vent 58. With no pressure fluid supplied to piston 62 the latter will remain in a rightward position in cylinder 61 maintaining valve 64 in a rightward position and directing fluid to retarding conduit 71. If the speed of prime mover 75 should drop below the desired speed because of the influence of fluid in retarding conduit 71, the frequency of pulses in main tube 30 will match the resonant frequency of Helmholtz resonator 40 causing a resonant condition in the latter blocking flow from branch conduit 36 to conduit 42 with a resulting flow of power fluid from nozzle 51 to right output conduit 59 under the influence of fluid in conduit 90. The fluid in conduit 59 will shift piston 62 to the right with power fluid being supplied to power conduit 70, as previously described, increasing the speed of prime mover 75. As can be seen resonators 81 and 40 will continuously be controlling tristable flip flop 60 and hence, through piston 62, control valve 64 to insure that prime mover 75 is below the upper speed limit set by Helmholtz resonator 81 and above the lower speed set by Helmholtz resonator 40.

If control valve 64 should stick or undergo a similar malfunction when power fluid is being directed to power conduit 70 the speed of rotational prime mover 75 will increase to where the frequency of pulses in main tube 30 is above the resonant frequency of Helmholtz resonator 81 and control of the system will be lost and a uncontrolled condition will prevail. This could also happen if the load on prime mover 75 were suddenly decreased rapidly increasing the speed thereof so that the speed of the prime mover would increase so rapidly that there would not be enough time for a resonant condition to be obtained in resonator 81. This is hereinafter called a runaway condition. To prevent this resonantor 670 is designed to resonate at a higher frequency than resonator 81 to act as a means to prevent a runaway condition. When the speed of prime mover 75 is in a runaway condition, for the reasons previously described, the frequency of pulses in main tube 30 will be above the resonant condition of Helmholtz resonators 81 and 40 but will be at the resonant frequency of resonator 670. The latter condition will stop flow from branch conduit 29 to conduit 26 which serves as the right control for amplifier 23. Since resonator 40 is not at resonance fluid will be directed to conduit 27, past restriction 420, switching the pressure fluid from conduit 19 to conduit 16 from where the fluid will move speed limit control valve to the right interrupting communication between inlet port 311 and discharge port 314 stopping flow of power fluid from conduit 11 to conduit 69 and to power conduit 70 of prime mover 75 through control valve 64. The stoppage of power fluid to prime mover 75 will cause the latter to reduce its speed from an energy consideration. As the speed of prime mover 75 decreases below the speed necessary to cause resonance in resonator 670 the latter will again act as a fluid capacitor directing fluid to conduit 26. While fluid is also in conduit 27 (the speed of prime mover 75 is still above the resonant frequency for resonator 40) amplifier 23 will continue to direct fluid to conduit 16 since if a signal is applied to both controls of a bistable amplifier the amplifier will continue to be attached to the sidewall it was when the plural signals were applied thereto. As the speed of prime mover 75 decreases resonator 81 will enter a resonant condition stopping flow from communicating with conduit 90. As resonator 40 is not at resonance conduit 42 will be pressurized directing fluid from nozzle 51 to left output 57. If the over speed condition of prime mover was caused by a runaway condition the fluid in conduit 57 will shift piston 62 to the right along with control valve 64. If the over speed condition was caused by malfunction of control valve 64 piston 62 will not be able to move. If the over speed is caused by a runaway condition valve 64 will move to the right but since speed limit cutoff valve 15 is in an off position no power fluid will be directed to prime mover 75. As the speed of prime mover 75 decreases from a lack of power fluid applied to it resonator 81 will no longer be at resonance and fluild from conduit 80 will be directed to conduit 90 combining with flow in conduit 42 to direct fluid from nozzle 51 to center vent 58 removing any pressure force from piston 62. Speed limit cut off valve 15 will still be in a rightward position not allowing power fluid to be directed to control valve 64 as bistable amplifier 23 will continue to direct fluild to conduit 16. As the speed of prime mover 75 continues to drop resonator 40 will resonate blocking communicate from conduit 36 to conduits 27 and 42. A lack of fluid in conduit 27 will allow fluid from main tube 30, via branch conduit 29, by resonator 670 to direct fluid to conduit 26 which will direct the pressure fluid from power nozzle 25 to conduit 19 moving speed limit cut off valve to the left allowing power fluild to be communicated, via inlet port 311, discharge port 314, conduit 69 to control valve 64. With resonator 40 at resonance there will be no fluid in conduit 42 and the fluid in conduit 90 will direct the pressure fluid from nozzle 51 to right output conduit 59. If the cause of the prime mover overspeed in control valve 64 sticking prime mover 25 will again speed up and resonator 81 will not be able to control the speed of prime mover 75 as the position of control valve 64 cannot be varied. Helmholtz resonator 670 will again act to slow prime mover 75 as previously described. To keep this cycle from repeating a counter mechanism could be placed in conduit 16 to shut off the supply to conduit 11 upon two separate fluid pulses being sensed in conduit 16. If the cause of over speed is from a speed runaway condition then, when valve 15 is shifted to an on position, the prime mover will be between the upper and lower control limits as set by resonators 81 and 40 and will continue to be automatically controlled as previously described.

If it were desired, tristable flip-flop 60 could be replaced by a proportional amplifier and control valve 64 could be designed to modulate power to prime mover 75. It is thus clear that I have designed a simple and flexible means to control the rotational speed of a prime mover.

It will be apparent that the embodiments shown are only exemplary and that various modifications can be made in construction and arrangement within the scope of the invention as defined in the appended claims.

I claim as my invention:

1. A control system for a bladed rotating prime mover comprising:
    (a) first means comprising a hollow tube positioned adjacent to blades of a rotating prime mover to produce a series of fluid pulses having a frequency indicative of the angular speed of the rotating prime mover,
    (b) second means associated with said prime mover to control the speed thereof, said second means including:
        (i) a source of power fluid,
        (ii) third means to utilize said power fluid to advance the speed of said rotating prime mover,
        (iii) fourth means to utilize said power fluid to retard the speed of said rotating prime mover, and
        (iv) control valve means to selectively direct said source of power fluid to either of said third and fourth means,
    (c) fifth means responsive to a frequency in said first means to control said second means,
    (d) sixth means responsive to a different frequency in said first means than said fifth means to control said second means,
    (e) a piston housed in a cylinder adjacent to said control valve, said piston having a piston rod extending from said cylinder joined to said control valve to actuate said control valve in response to a signal from said second means.

2. A device according to claim 1 wherein a first fluid amplifier has means to generate a fluid jet, a first control means to control said fluid jet is positioned on one side of said means to generate a fluid jet and a second control means to control said fluid jet is positioned on a second side of said means to generate a fluid jet, a left output conduit is positioned downstream of said means to generate a fluid jet and a right output conduit is positioned downstream of said means to generate a fluid jet, and said left and right output conduits being communicated to said cylinder on opposite sides of said piston therein.

3. A device according to claim 2 wherein said first means is a main tube positioned adjacent said blades of said rotating prime mover.

4. A device according to claim 3 wherein:
    (a) said fifth means is a Helmholtz fluid resonator having an inlet port and a discharge port, said inlet port being in parallel relation with said main tube and said discharge port communicating with said first control means of said fluid amplifier, and
    (b) said sixth means is an Helmholtz fluid resonator having an inlet port and a discharge port, said inlet port being in parallel relation with said main tube and said discharge port communicating with said second control means of said fluid amplifier.

5. A device according to claim 4 wherein said discharge port of each of said Helmholtz resonators is of a smaller cross-sectional area than said inlet port of each of said Helmholtz resonators.

6. A device according to claim 5 wherein a speed limit cut-off valve allows communication of power fluid to said control valve.

7. A device according to claim 6 wherein overspeed means control the operation of said speed limit cut-off valve.

8. A device according to claim 7 wherein said speed limit cut-off valve includes a valve housing having a first end and a second end, a port located in each of said ends and a pressure operated valve spool located in said housing.

9. A device according to claim 8 wherein a second fluid amplifier has means to generate a power jet, a first control means adjacent said means to generate a power jet, a second control means adjacent said means to generate a power jet, a first output conduit down-stream of said means to generate a power jet in communication with said port in one end of said speed limit cut-off valve housing, a second output conduit downstream of said means to generate a power jet in communication with said port in said other end of said speed limit cut-off valve housing, a conduit communicating said second Helmholtz resonator with said first control means of said second amplifier, and means sensitive to the frequency of fluid pulses in said main tube communicating said main tube and said second control means of said second fluid amplifier.

10. A device according to claim 9 wherein said means sensitive to fluid pulses in said main tube communicating said main tube and said second control means of said second fluid amplifier is a third Helmholtz fluid resonator having a higher resonant frequency than said first and said second Helmholtz fluid resonators.

11. A device according to claim 9 wherein said second fluid amplifier is a bistable amplifier and said conduit communicating said second Helmholtz resonator with said first control means of said second fluid amplifier has a restriction therein adjacent said second amplifier.

12. A device according to claim 2 wherein said first fluid amplifier has a center vent output conduit positioned between said left output conduit and said right output conduit.

13. A device according to claim 12 wherein said first fluid amplifier includes means to prevent fluid issuing from said means to generate a fluid jet from being directed to more than one output conduit.

14. A device according to claim 11 wherein adjustable means control the communication of said main tube and ambient.

References Cited

UNITED STATES PATENTS

| | | | |
|---|---|---|---|
| 2,982,902 | 5/1961 | LeGates et al. | 60—73 X |
| 3,136,326 | 6/1964 | Bryant | 253—59 X |
| 3,260,271 | 7/1966 | Katz. | |
| 3,292,648 | 12/1966 | Colston. | |
| 3,370,831 | 2/1968 | Lazar | 253—52 |

EVERETTE A. POWELL, JR., *Primary Examiner.*

U.S. Cl. X.R.

253—52, 59